United States Patent [19]

Pück et al.

[11] Patent Number: 4,605,385

[45] Date of Patent: * Aug. 12, 1986

[54] FIBRE REINFORCED PLASTICS POWER TRANSMISSION SHAFT

[75] Inventors: Alfred Pück, Basel; Peter Voirol, Binningen, both of Switzerland

[73] Assignee: Ciba-Geigy Corporation, Ardsley, N.Y.

[*] Notice: The portion of the term of this patent subsequent to Dec. 7, 1999 has been disclaimed.

[21] Appl. No.: 685,202

[22] Filed: Dec. 24, 1984

Related U.S. Application Data

[62] Division of Ser. No. 70,188, Aug. 26, 1979, abandoned.

[30] Foreign Application Priority Data

| Sep. 7, 1978 [CH] | Switzerland | 9409/78 |
| Sep. 12, 1978 [CH] | Switzerland | 9542/78 |
| Sep. 12, 1978 [CH] | Switzerland | 9546/78 |
| May 10, 1979 [CH] | Switzerland | 4373/79 |

[51] Int. Cl.$^4$ ............................................. F16D 3/26
[52] U.S. Cl. ................................. 464/181; 138/109; 138/130; 428/36; 464/183
[58] Field of Search .................. 464/181; 74/5 A, 5 R, 74/581; 138/130, 109; 156/169, 172, 173, 175; 428/35, 36

[56] References Cited

U.S. PATENT DOCUMENTS

| 3,433,696 | 3/1969 | Michael | 156/425 |
| 4,039,006 | 8/1977 | Inoue et al. | 156/173 |
| 4,171,626 | 10/1979 | Yates et al. | 156/173 |
| 4,173,670 | 11/1979 | Van Auken | 64/1 S |
| 4,185,472 | 1/1980 | Yates et al. | 138/109 |
| 4,186,696 | 2/1980 | Linsenmann | 464/181 |
| 4,362,521 | 12/1982 | Puck et al. | 464/181 |

*Primary Examiner*—Michael Ball
*Attorney, Agent, or Firm*—Harry Falber

[57] ABSTRACT

A process for producing reinforced plastics tube for use, inter alia, as a transmission shaft wherein the tube is produced by winding on to a core reinforcing fibres preferably of carbon impregnated with a curable plastics at predetermined winding angles <35° and then winding on to the reinforcing fibres at angles between ±80° and ±90° a peripheral winding of a material which is relatively resilient with respect to the reinforcing fibres and which has a high coefficient of thermal expansion. The tube so formed is then heat cured. Fittings are secured to the ends of the tube and the ends may be reinforced with a carbon fibre structure.

20 Claims, 7 Drawing Figures

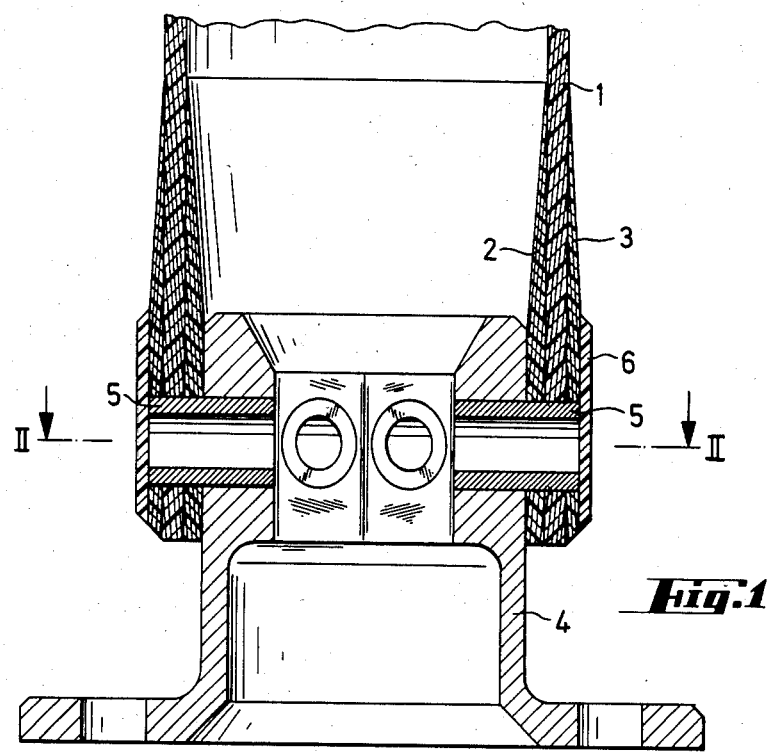
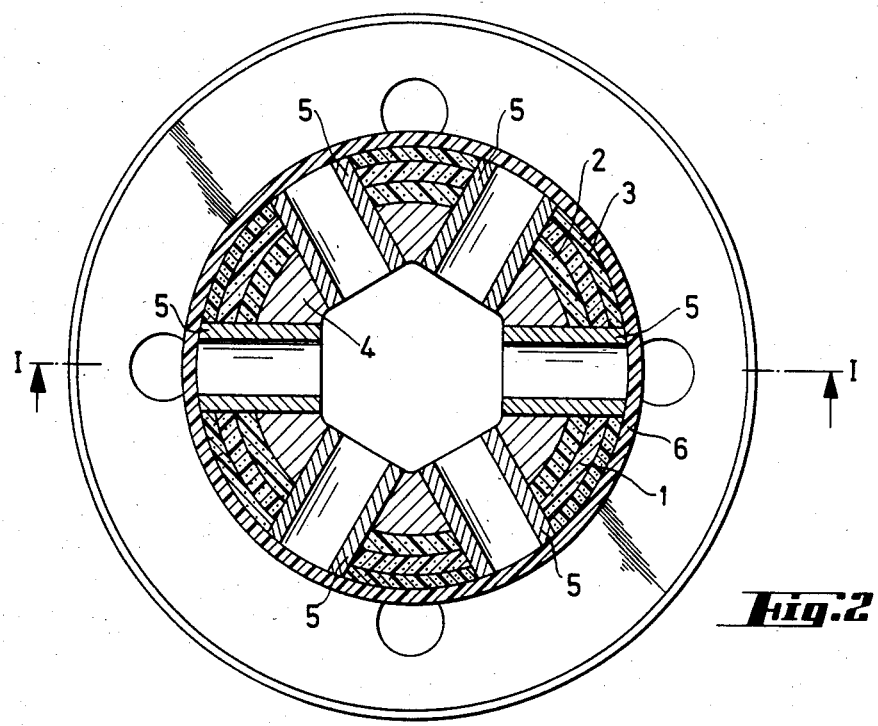

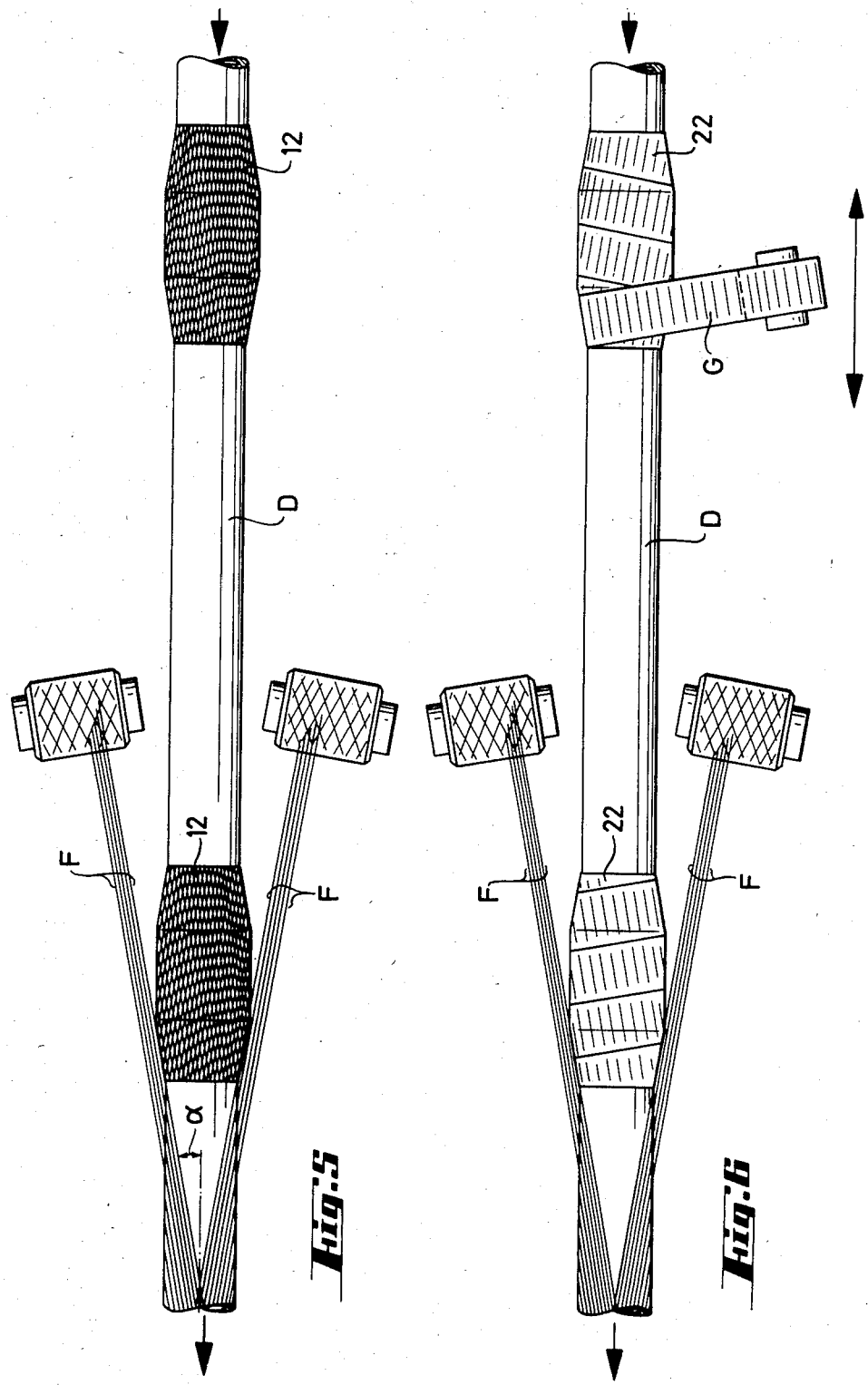

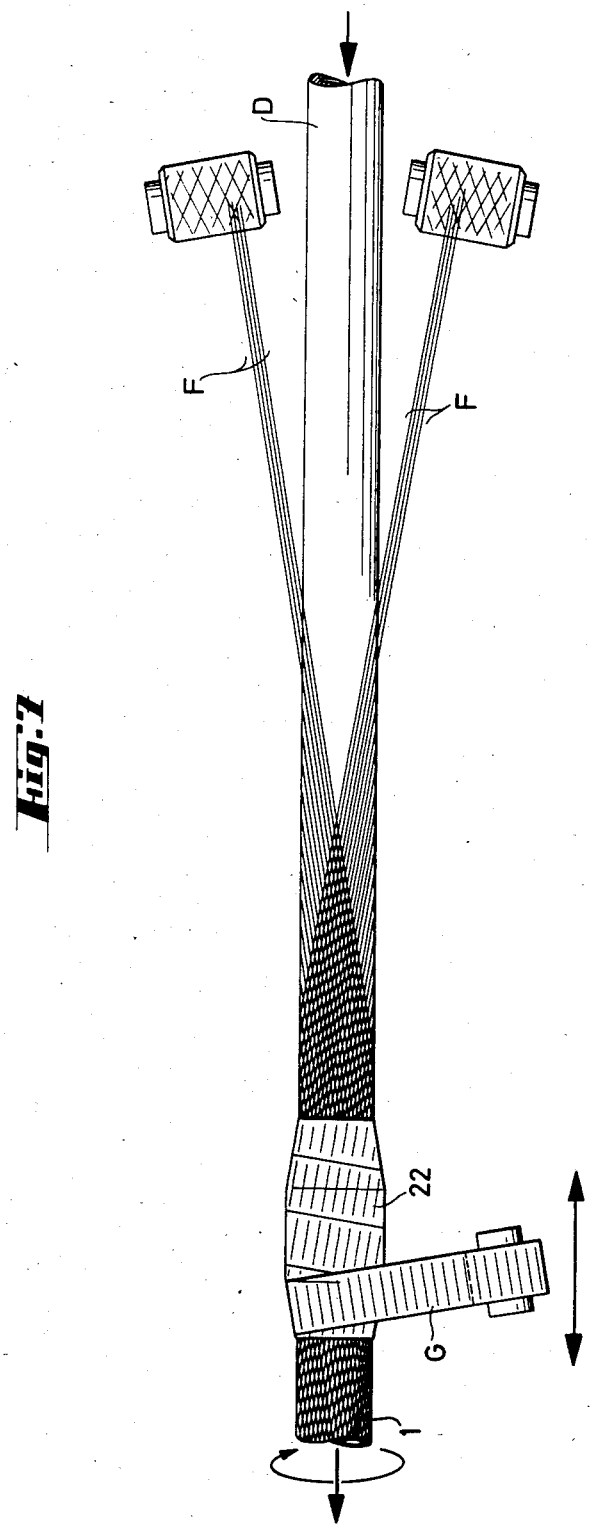

FIBRE REINFORCED PLASTICS POWER TRANSMISSION SHAFT

This application is a division of application Ser. No. 070,188, filed 8/26/79, now abandoned.

FIELD OF THE INVENTION

This invention relates to a process for the production of a plastics tube reinforced by fibres of high stiffness, reinforcing fibres which are impregnated with a curable plastic being applied to a core at predetermined winding angles, and the whole then being cured. The invention also relates to a plastics tube made according to the new process and also to a power transmission shaft including such a plastics tube.

A high fibre content is often required in fibre-reinforced plastics tubes in order to obtain high strength and stiffness values. In glass fibre reinforced plastics technology, the usual procedure is to apply a final peripheral winding of glass fibres (winding angle about 90°) at a predetermined tension to the completed fibre structure. This peripheral winding compresses the fibre structure therebeneath and presses out the surplus laminating resin. This technology, however, is ineffective in the production of plastics tubes reinforced by high-stiffness fibres, more particularly carbon fibres, because of their extremely high anisotropy. If a carbon fibre peripheral winding of this kind were to be applied, for example, to a longitudinal winding (winding angle close to 0°), or a 45° winding, high interlaminar stresses would develop on curing of the laminating resin or on temperature fluctuations during production of the tube or its subsequent operation, because of the anisotropy of the fibres. These would have a very considerable effect on the strength properties of the tube.

OBJECT OF THE INVENTION

It is therefore an object of the invention to provide a process for the production of a fibre-reinforced plastics tube which enables high fibre contents to be obtained even in the case of reinforcing fibres of high stiffness or considerable anisotropy.

A further object of the invention is to provide an improved carbon fibre reinforced plastics tube for particular use as a drive shaft.

SUMMARY OF THE INVENTION

According to this invention, before the curing operation, a peripheral winding (winding angle about $\pm 80$ to $\pm 90°$) comprising a material which is relatively resilient with respect to the fibres and which has a high coefficient of thermal expansion is applied to the reinforcing fibres. The winding material, which may, for example, be fibres, strips or fabrics or polyester or polyamide, is preferably applied at a tension such that the fibre content of the tube wall is about 50 to 70 vol%. The modulus of elasticity of the winding material may, for example, be about $3000 N/mm^2$.

The reinforcing fibres may be of carbon and are preferably oriented at a winding angle of max $\pm 30°$, preferably $\pm 10$ to $\pm 20°$ to the tube axis, the fibre content preferably being 50 to 70 vol%.

A torque fitting can be secured on or in each end of the tube to form a propeller shaft.

In the prior art power transmission shafts consisting of carbon fibre reinforced plastics of the kind described in U.S. Pat. Nos. 4,041,599 or 4,089,190 the fittings are cemented into the ends of the plastics tube or integrated (wound) into the tube ends by means of long tubular portions, during production of the tube. In either case the torque transmission is via a cemented joint, and this has proved inadequate, particularly at high torques. In addition, it is difficult in practice to wind the fittings into the tube with the very small winding angles (about $\pm 10$ to 20° to the tube axis) required according to the above remarks. All these problems and the high fibre costs have contributed to the fact that fibre reinforced plastics propeller shafts have not hitherto been successful.

Therefore, yet another object of the invention is to provide a power transmission shaft having an improved torque introduction.

BRIEF DESCRIPTION OF THE DRAWINGS

A preferred embodiment of the invention is explained in detail hereinafter with reference to the accompanying drawings, wherein:

FIG. 1 is an axial section through one end of a shaft produced by a process according to the invention;

FIG. 2 is a cross-section through the shaft on the line II—II in FIG. 1;

FIGS. 4 to 7 are diagrams to explain the production of the tube wall reinforcements.

DETAILED DESCRIPTION OF A PREFERRED EMBODIMENT

Figure 4:
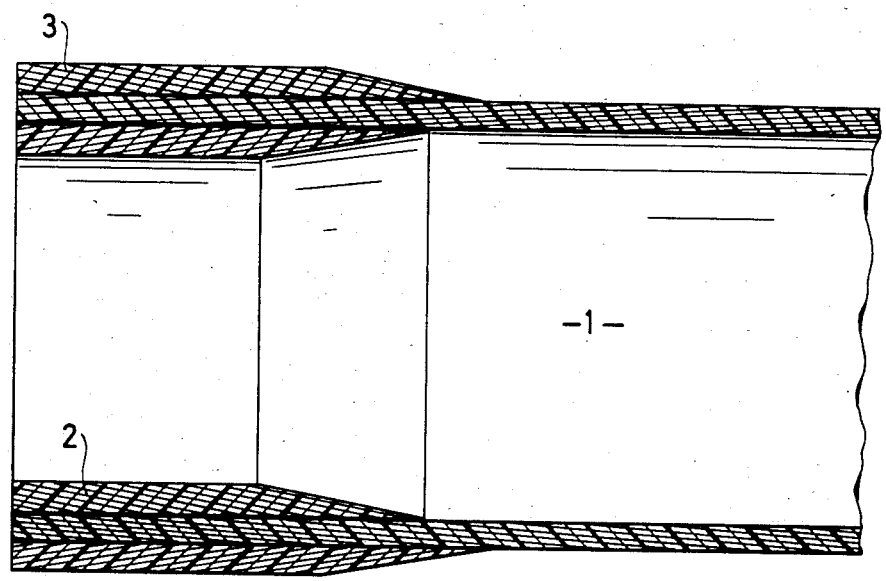

The shaft illustrated in FIGS. 1 and 2 comprises a plastics tube 1 which is reinforced by means of carbon fibres and which is reinforced at each end (only one end is shown in FIG. 1) by a cemented-in sleeve 2 and a cemented-on tubular portion 3. A metal fitting 4 is pushed into the inner reinforcing sleeve 2. The torque is transmitted from the metal fitting 4 to the shaft by radial bolts 5. The latter are secured by a sleeve 6 cemented onto the outer reinforcing sleeve 3.

Figure 3:
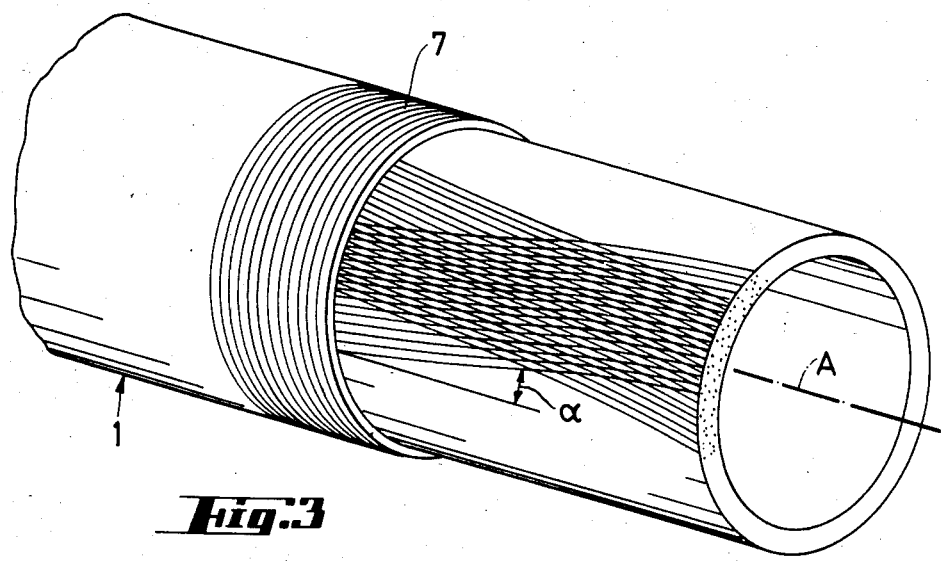
FIG. 3 is a diagrammatic detail of the shaft showing the tube winding structure.

The fibre-reinforced plastics tube may be produced by winding methods described, for example, in U.S. Pat. Nos. 2,723,705, 3,068,134, 3,202,560, 3,216,876, 3,700,519, and 4,089,190. As shown diagrammatically in FIGS. 5 to 7, carbon reinforcing fibres F impregnated with a curable plastics are wound from two reels onto a core D at predetermined winding angles $\alpha$ so that the fibres from one reel cross the fibres from the other reel to form a winding pattern as shown in FIGS. 3 and 7. If fibres from one reel are wound on the core at an angle of $+\alpha$ and the fibres of the other reel wound on the core at an angle of $-\alpha$, then one set of fibres will cross the other set at an angle of $2\alpha$. The whole is then cured by heat.

The carbon reinforcing fibres used are preferably those marketed under the name "Thornel Type P" by the Union Carbide Corporation, of 270 Park Avenue, New York, N.Y. 10017, i.e. pitch fibres.

The inclination or winding angle of the fibres to the tube axis varies according to the intended application. The winding angle $\alpha$ (FIG. 3) with respect to the tube axis A is about $\pm 25°$ to 30° maximum, but preferably $\pm 20°$ maximum or less. Although a smaller winding angle than 10° increases the modulus of elasticity of the tube in the longitudinal direction, it also reduces the torsional stiffness to values which are inadmissibly low for use as a propeller shaft. Winding angles of $\pm 11°$ to $\pm 17°$ have proved advantageous in practice, more particularly angles in a range of from ±12° to ±14°. These winding angles give both sufficiently high torsional stiffness and sufficiently high longitudinal flexural stiffness. It is evident that there could be provided also several layers of reinforcing fibres each being oriented at a different winding angle within the given limits.

The fibre content of the plastics tube is about 50 to 70, preferably about 60 to 70 vol%. To obtain this relatively high fibre content, and in accordance with this invention the outside of the tube is provided with a peipheral winding 7 (FIG. 3) comprising a lightweight material with a low modulus of elasticity, which is relatively resilient in comparison with the carbon fibres, and which has a high coefficient of thermal expansion, this operation being carried out during production, i.e. while the laminating resin is still flowable. Polyesters for example (e.g. Diolen (R.T.M), modulus of elasticity about $3000 N/mm^2$) or polyamide (+B Nylon (R.T.M) tear strip (Interglas quality 7849) is suitable material (fibres, strips or fabrics). The coefficient of thermal expansion of this lightweight material should be higher than the corresponding coefficient of the reinforcing fibre-resin-compound in the circumferential direction, e.g. approx. $25-30 \times 10^{-6}/°K$. and more. The peripheral winding is applied with maximum tension (tractive force about 200–500N). However, the tractive force should not of course have values such as to damage the material. The peripheral winding presses the surplus laminating resin out of the fibre structure but, because of its high coefficient of thermal expansion and its resilience, does not produce any appreciable interlaminar stresses on cooling after curing and cooling of the tube.

Low-viscosity curable epoxy resins, for example the resin marketed by CIBA-GEIGY AG, of Basle, Switzerland, under the name "Araldit CY 209" with the curing agent HT 972, or other resin and curing agent combinations giving the required thermal and mechanical strenght, may be used as the plastics for the production of the tube.

The tube 1, the reinforcing fibres of which are themselves highly anisotropic and, in addition are oriented at a small angle to the tube axis, have an extremely anisotropic behaviour, which is manifested particularly by very different strength, modulus of elasticity values, and coefficients of thermal expansion in the longitudinal and peripheral directions.

Owing to this extreme anisotropy of the multilaminate tube structure, it is very important that the reinforcing sleeves 2 and 3, sandwiching the end of the tube 1 and which are subject to high transmission torque, should be of the same material as, or similar material to, the tube and have the same or at least substantially the same anisotropy behaviour as the tube 1. If this is not the case, considerable stresses occur between the reinforcing sleeves and the tube ends on temperature fluctuations, which could result in rupture in the extreme case.

It is also important that the reinforced zones of the tube should not terminate abruptly, but that the thickening of the tube wall at the tube ends should gradually diminish down to the wall thickness of the tube 1. For this purpose, the reinforcing sleeves 2, 3 are mechanically machined so that they taper conically towards the tube centre. This smooth continuous transition from the reinforced tube end to the non-reinforced wall zone of the tube avoids any stress peaks.

In FIGS. 1, 2 and 4 the wall reinforcements of the tube ends are formed by prefabricated reinforcing sleeves which are cemented on or into the tube. The reinforcements may, however, be produced in some other way although this is not such a simple matter in terms of winding technique, because of the very small winding angles that need to be used.

For example, referring to FIG. 5, prefabricated and appropriately shaped reinforcing sleeves 12 disposed with a spacing corresponding to the intended tube length on the mandrel D used for producing the tube may be incorporated into the tube structure by covering them with the carbon fibres F.

Referring to FIG. 6, the prefabricated reinforcing sleeves 12 may be replaced by a local winding 22 on the mandrel, said winding consisting of a unidirectional fibre fabric G. The fibres of the fabric are so aligned as to occupy the same positions in the winding as do the fibres of the tube, thus giving the same anisotropy behaviour.

Instead of directly incorporating the wall reinforcements in the tube fibre structure (FIGS. 5 and 6), the coil 22 of unidirectional fabric G may, as shown in FIG. 7, be applied to the completed tube 1 subsequently.

For continuous tube production of the kind which has long been conventional in the case of glass fibre reinforced plastics tubes, the most advantageous procedure would appear to be to wind over the prefabricated sleeves as shown in FIG. 5.

In the case of tubes produced in accordance with FIGS. 5 to 7, the tube ends are simply thickened towards the exterior. This is immaterial however provided that the wall thickness thus obtained is sufficient to take the stresses produced by the applied torque when in use.

A plastics carbon shaft constructed with a winding angle of ±12° to the axis and a pitch fibre content of 70% of the total material volume, had a critical speed of more than 8100 rpm and a torsional stiffness such that the required maximum shaft twist angle of 12° was not exceeded at maximum torque (1500 Nm)

We claim:

1. A power transmission shaft, comprising a tube of carbon fibre reinforced plastics, fittings secured to its two ends and at each end of the tube a wall reinforcement of carbon fibre reinforced plastics tapering substantially gradually towards the middle of the tube, the wall reinforcement fibre structure being similar to that of the tube so that the tube and the wall reinforcements have at least approximately the same anisotropic behaviour, and radial bolts located in the region of the wall reinforcements securing said fittings to said tube.

2. A shaft according to claim 1, including a sleeve fixed to each end of the tube securing said radial bolts.

3. A shaft according to claim 1, wherein the tube ends are reinforced only on the outside of the tube.

4. A shaft according to claim 1, wherein the tube ends are reinforced both on the outside of the tube and on the inside of the tube.

5. A shaft according to claim 1, wherein the wall reinforcements are integral with the tube.

6. A shaft according to claim 1, wherein the wall reinforcements are formed by separately-produced tubular portions cemented with the tube.

7. A shaft according to claim 1, wherein the wall reinforcements are formed by separately produced tubular portions wound into the tube structure during its production.

8. A shaft according to claim 1, wherein the wall reinforcements are formed by local additional windings of a unidirectional fibre fabric, which are applied during the manufacture of the tube.

9. A shaft according to claim 8, wherein the additional windings are disposed above the tube fibres.

10. A shaft according to claim 8, wherein at least some of the tube fibres are disposed above the additional windings.

11. A power transmission shaft, comprising a tube formed by carbon fibres oriented at a predetermined winding angle to the tube axis and a peripheral winding of material which is relatively resilient with respect to the reinforcing fibres and which has a high coefficient of thermal expansion wound over said carbon fibres and oriented at an angle in the range ±80 to ±90° to the tube axis, a wall reinforcement at each end of said tube formed of carbon fibre reinforced plastics and tapering substantially gradually towards the middle of the tube, the wall reinforcement fibre structure being similar to that of the tube so that the tube and the wall reinforcements have at least approximately the same anisotropic behaviour, fittings at each end of the tube and radial bolts located in the region of the wall reinforcements securing said fittings to said tube.

12. A shaft according to claim 11, wherein the content of reinforcing fibres is in the range 50–70 Vol%.

13. A shaft according to claim 11, wherein substantially all reinforcing fibres are oriented at an angle of ±30° maximum to the tube axis.

14. A shaft according to claim 13, wherein the reinforcing fibres are oriented at an angle from ±10° to ±20° to the tube axis.

15. A power transmission shaft comprising a plastics tube reinforced with fibres of high stiffness and low specific gravity, oriented at a winding angle of max.±30° to the tube axis.

16. A shaft according to claim 15, wherein the winding angle is in the range of ±10° to ±25°.

17. A shaft according to claim 16, wherein the winding angle is ±20° maximum, preferably in the range ±10° to ±17°.

18. A shaft according to claim 15, wherein the reinforcing fibres are carbon fibres.

19. A shaft according to claim 15, wherein the content of reinforcing fibres in the formed tube is in the range from 50 to 70%, preferably in the range from 60 to 70%.

20. A shaft according to claim 15, wherein the tube comprises a peripheral winding of a material which is relatively resilient with respect to the reinforcing fibres and which has a high coefficient of thermal expansion.

* * * * *